United States Patent
Chan et al.

(10) Patent No.: US 8,274,754 B2
(45) Date of Patent: Sep. 25, 2012

(54) SYSTEM, METHOD AND APPARATUS FOR INTEGRATED BYPASS CHANNEL AND DIVERTER FOR HARD DISK DRIVES

(75) Inventors: Andre S. Chan, Milpitas, CA (US); Chisin Chiang, San Jose, CA (US); Ferdinand Hendriks, Morgan Hill, CA (US); James Francis Sullivan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 927 days.

(21) Appl. No.: 12/117,944

(22) Filed: May 9, 2008

(65) Prior Publication Data

US 2009/0279203 A1    Nov. 12, 2009

(51) Int. Cl.
G11B 33/08 (2006.01)
G11B 33/14 (2006.01)
H05K 7/20 (2006.01)

(52) U.S. Cl. .................. 360/97.13; 360/97.14
(58) Field of Classification Search .... 360/97.02–97.04, 360/97.13–97.17
See application file for complete search history.

(56) References Cited

U.S. PATENT DOCUMENTS

| | | |
|---|---|---|
| 6,271,989 B1 | 8/2001 | Tannert |
| 6,628,475 B2 | 9/2003 | Nakamoto et al. |
| 6,788,493 B1 | 9/2004 | Subramaniam et al. |
| 6,898,049 B2 | 5/2005 | Shimizu et al. |
| 7,158,342 B2 | 1/2007 | Chan et al. |
| 7,203,030 B2 | 4/2007 | Chan et al. |
| 7,239,475 B1 | 7/2007 | Lin et al. |
| 2002/0039251 A1* | 4/2002 | Imai et al. .................. 360/97.02 |
| 2002/0039253 A1* | 4/2002 | Imai et al. .................. 360/97.02 |
| 2005/0041329 A1* | 2/2005 | Chan et al. ................. 360/97.02 |
| 2005/0041332 A1* | 2/2005 | Chan et al. ................. 360/97.02 |
| 2005/0185324 A1* | 8/2005 | Suwa et al. ................. 360/97.02 |
| 2006/0139796 A1* | 6/2006 | Kanada et al. ............. 360/97.02 |
| 2006/0238915 A1 | 10/2006 | Hendriks |

(Continued)

FOREIGN PATENT DOCUMENTS

DE    1412479    11/1975

OTHER PUBLICATIONS

Kirpekar, Sujit, et al.; A Study on the Efficacy of Flow Mitigation Devices in Hard Disk Drives, IEE Transactions on Magnetics, vol. 42, No. 6, Jun. 2006.

(Continued)

*Primary Examiner* — Daniell L Negron
*Assistant Examiner* — Adam B Dravininkas

(57) ABSTRACT

An integrated bypass channel and diverter assembly for hard disk drives having small form factors is disclosed. A bypass channel is formed directly in the base plate to allow a partial bypass to exist with or without a diverter feature. The design addresses the issue of proper disk shrouding at the same time as providing the desired features for small form factor drives. The invention includes three datum planes for aligning the machined features of the bypass channel with the drive during assembly. The machined bypass channel and the upstream diverter may be combined to form the integrated assembly. The primary air flow direction from the disk stack is through the integrated partial bypass in the enclosure body and around the diverter into the main bypass channel. The invention provides a drop-in position for the diverter that has minimal encroachment into the VCM area of the drive.

13 Claims, 7 Drawing Sheets

U.S. PATENT DOCUMENTS

2006/0262294 A1    11/2006    Babin et al.
2007/0188914 A1*    8/2007    Gross .......................... 360/97.02
2008/0074781 A1*    3/2008    Chan et al. ................. 360/97.02
2009/0002890 A1*    1/2009    Chan et al. ................. 360/235.4

OTHER PUBLICATIONS

Ikegawa, Masato, et al., Decreasing Airflow Velocity in Hard Disk Drives with a Spoiler and Bypass, IEEE Transactions on Magnetics, vol. 42, No. 10, Oct. 2006.

* cited by examiner

SYSTEM, METHOD AND APPARATUS FOR INTEGRATED BYPASS CHANNEL AND DIVERTER FOR HARD DISK DRIVES

BACKGROUND OF THE INVENTION

1. Technical Field

The present invention relates in general to hard disk drives and, in particular, to an improved system, method, and apparatus for an integrated bypass channel and diverter that is especially useful for hard disk drives having a small form factor 2. Description of the Related Art Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy, glass or a mixture of glass and ceramic, and are covered with a magnetic coating that contains the bit pattern. Typically, one to five disks are stacked vertically on a common spindle that is turned by a disk drive motor at thousands of revolutions per minute (rpm). Hard disk drives have several different typical standard sizes or formats, including server, desktop, mobile and micro drives.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

Hard disk drives with small form factors can present particularly challenging design constrains due to their lack of space or "real estate" within the drive enclosure. For example, designing a diverter for an aerodynamic bypass channel with the drive can have several geometric constraints from an assembly standpoint. As shown in FIG. 1, conventional drives having small form factors have no supporting platform in the vicinity 11 of the bypass channel 13. This presents a problem during the installation process where the bypass and/or diverter 13 would have an unsupported overhang 15 that encroaches into the VCM area 17. As shown in FIG. 2, this encroachment of the overhang 15 can persist even in the installed position. There also is a lack of space for the datum planes (e.g., walls) that are needed to slidingly align the bypass/diverter into its proper position during installation. Thus, an improved system, method, and apparatus for a bypass channel and diverter for hard disk drives having small form factors would be desirable.

SUMMARY OF THE INVENTION

Embodiments of a system, method, and apparatus for an integrated bypass channel and diverter assembly for hard disk drives having small form factors are disclosed. The invention includes a bypass channel that is formed directly in the base plate. This design also allows a partial bypass to exist with or without a diverter assembly. Unlike conventional partial bypass designs, this design addresses the issue of proper disk shrouding at the same time as providing the desired features for small form factor drives.

The invention includes proper datum planes in three different dimensions for aligning the machined features of the bypass channel with the drive during assembly The machined bypass channel and the upstream diverter assembly may be combined to form the integrated assembly. The primary air flow direction from the disk stack is through the integrated partial bypass in the enclosure body and around the diverter assembly into the main bypass channel. The invention provides a drop-in position for a diminutive diverter assembly that has minimal encroachment into the VCM area of the drive. This design also provides a better part-to-platform area ratio for such an installation.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
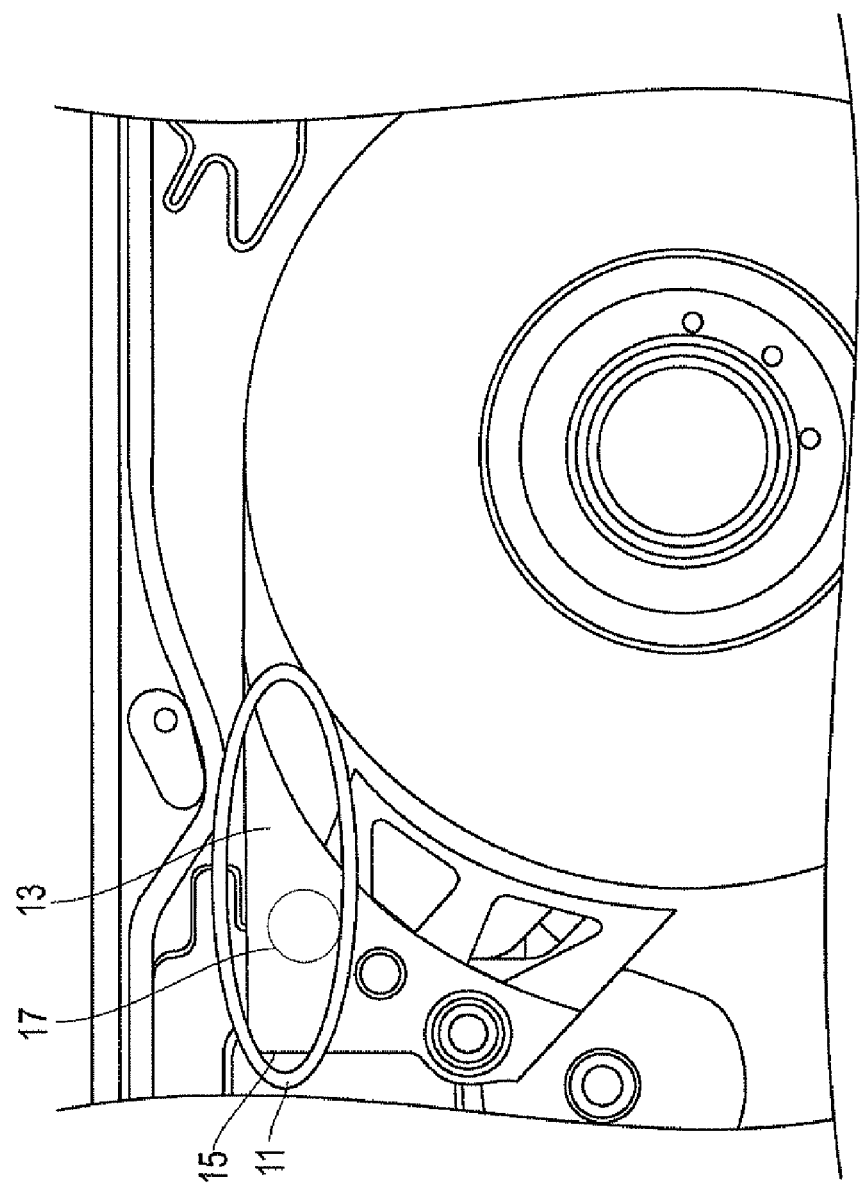
FIG. 1 is a plan view of a conventional hard disk drive showing a diverter/bypass prior to final installation.
Figure 2:
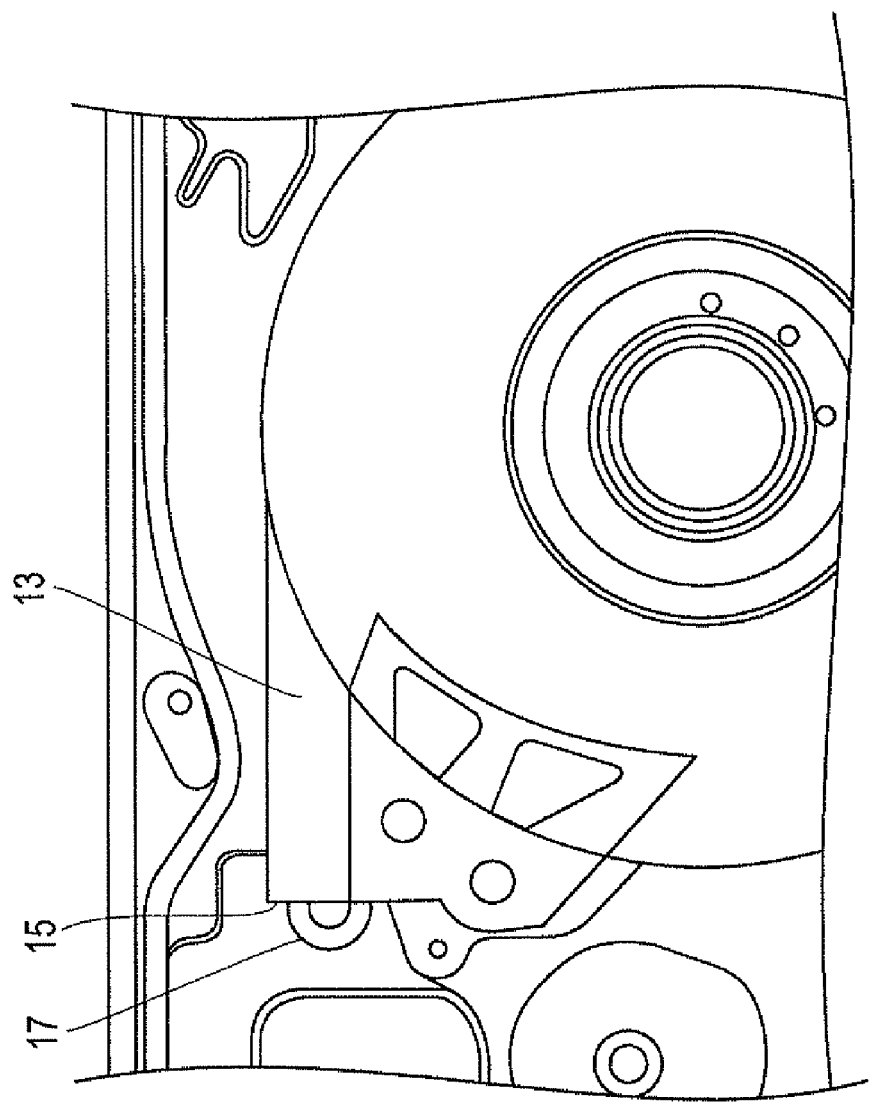
FIG. 2 is a plan view of the conventional hard disk drive of FIG. 1 showing the diverter/bypass installed.
Figure 3:
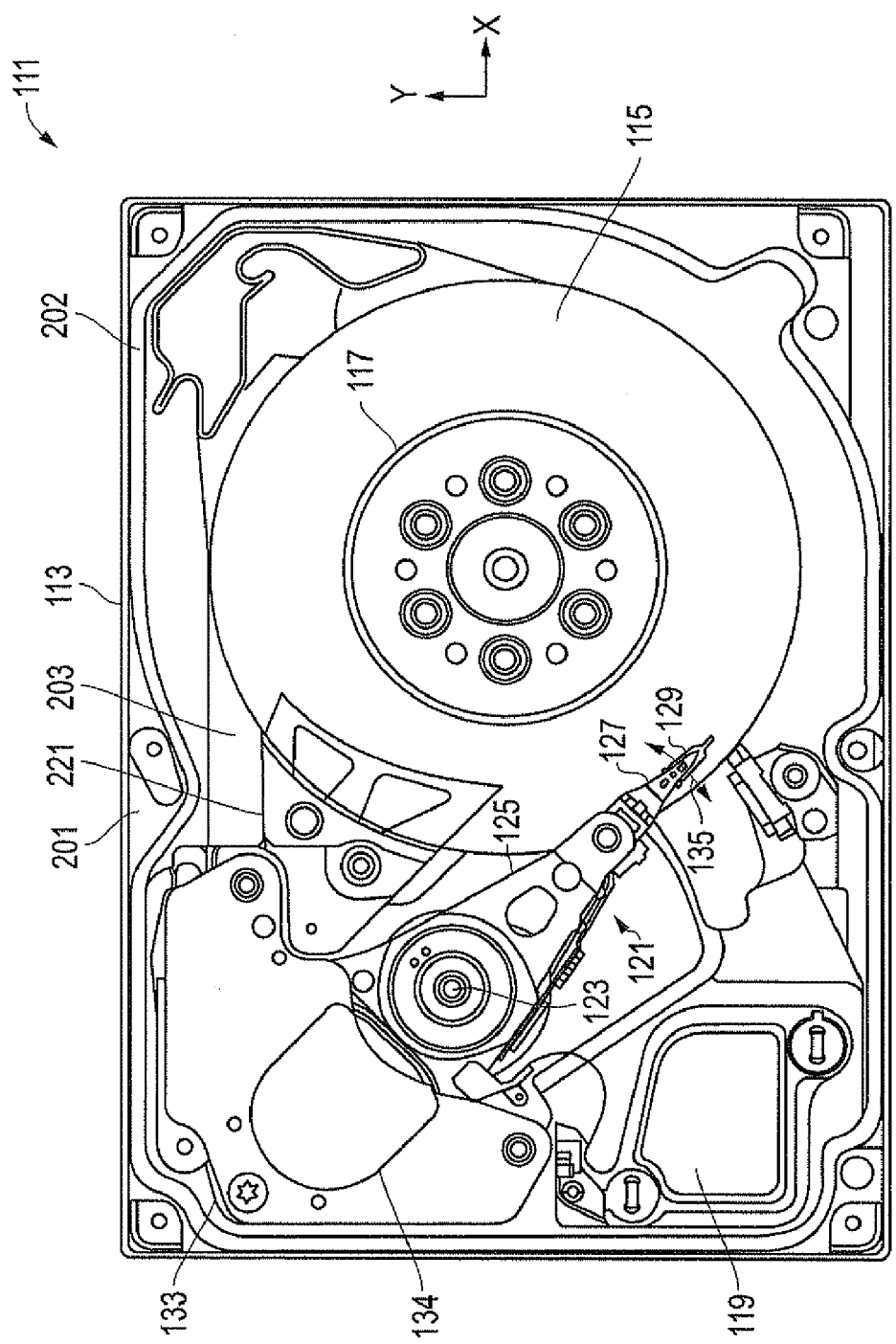
FIG. 3 is a schematic plan view of one embodiment of a disk drive constructed in accordance with the invention.

Referring to FIG. 3, a schematic drawing of one embodiment of an information storage system comprising a magnetic hard disk file or drive 111 for a computer system is shown. Drive 111 has an outer enclosure including a base 113 containing at least one magnetic disk 115. A top cover for base 113 is not shown to illustrate some of the contents of drive 111. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

Figure 4:
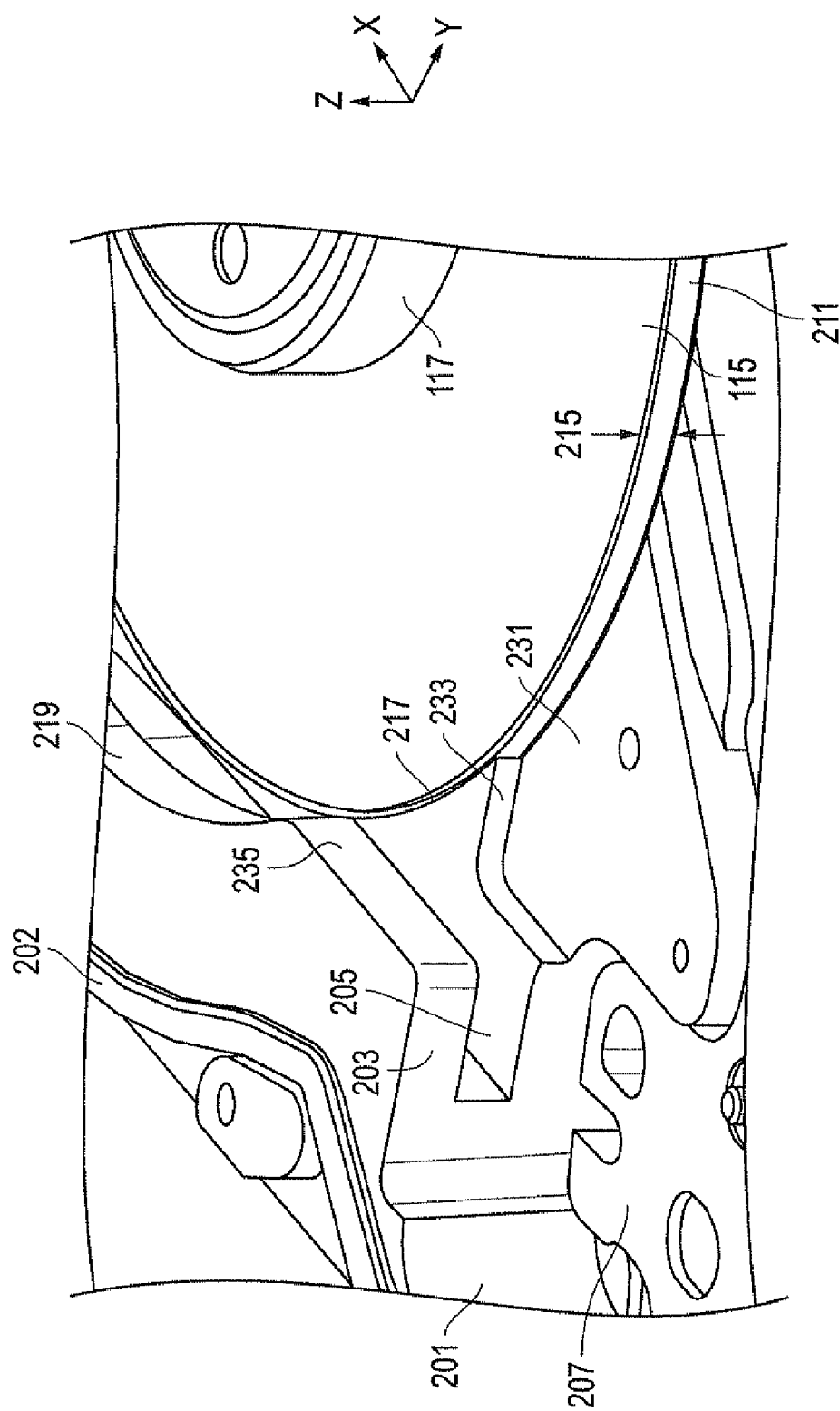
FIG. 4 is an enlarged isometric view of a portion of the disk drive of FIG. 3 without a diverter installed.
Figure 5:
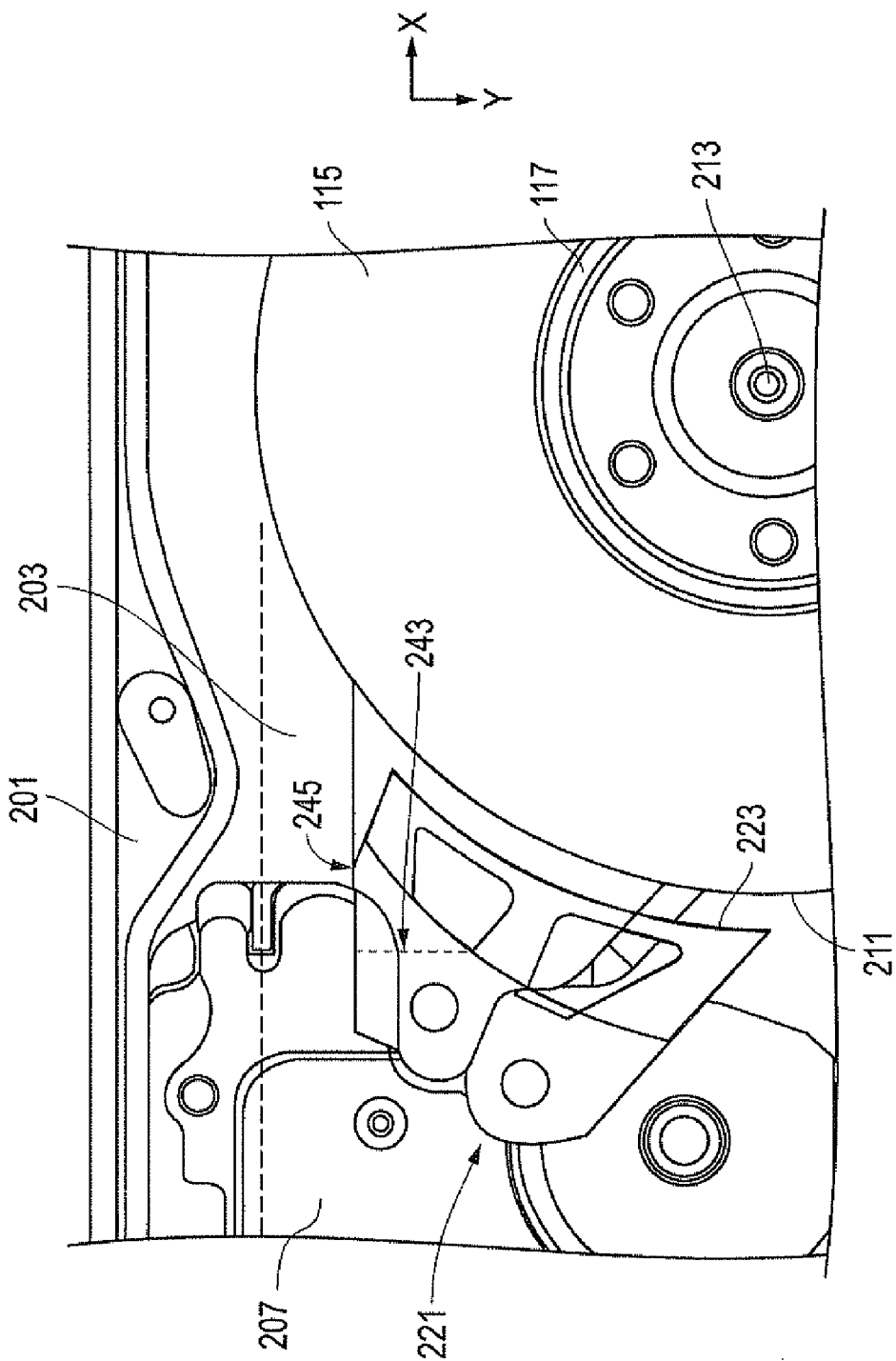
FIG. 5 is a plan view of the disk drive of FIG. 4 with the diverter partially installed.
Figure 6:
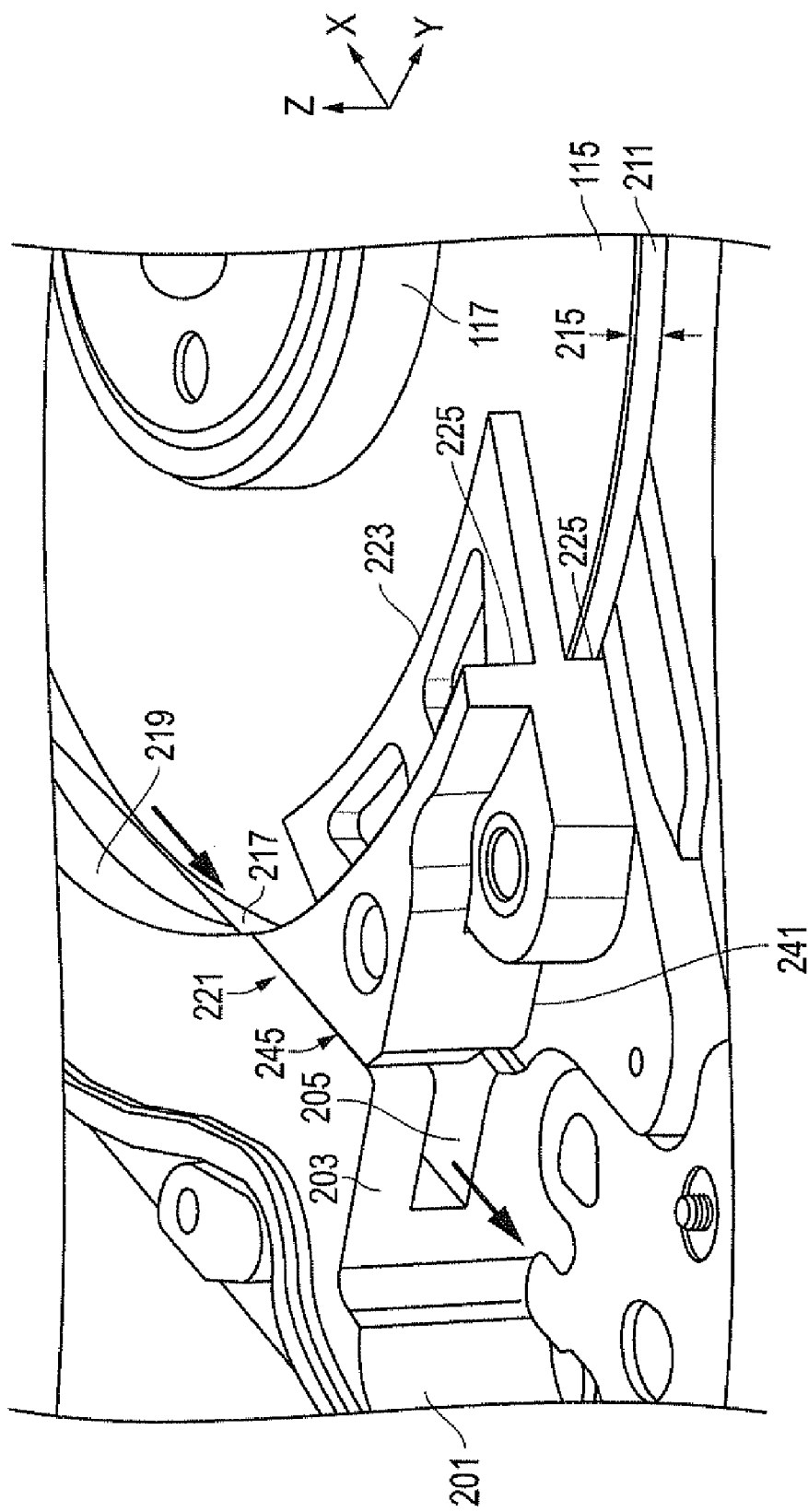
FIG. 6 is an enlarged isometric view of the disk drive of FIG. 5 with the diverter installed.
Figure 7:
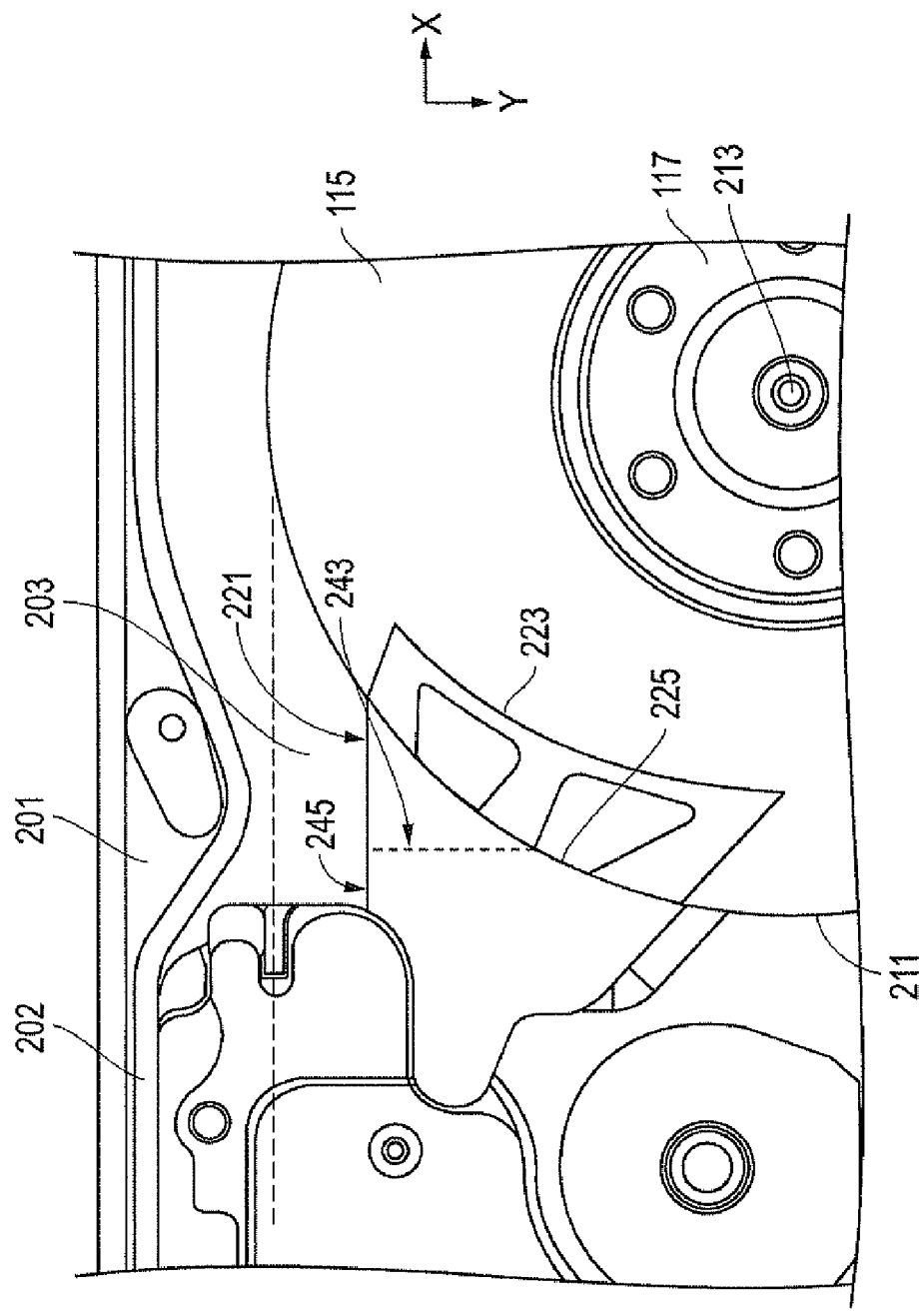
FIG. 7 is a plan view of the disk drive of FIG. 6 with the diverter installed.

Referring now to FIGS. 4-7, embodiments of disk drive 111 constructed in accordance with the invention are shown. The hard disk drive 111 may comprise may comprise an enclosure having a coordinate system defining x, y and z-directions as shown. The base 113 generally extends in an x-y plane direction. A sidewall 201 extends from the base 113 generally in the z-direction, and substantially circumscribes the base 113 along with a gasket 202 that seals to the top cover (not shown). A transverse wall 203 generally extends in the x-y plane direction from the sidewall 201. As shown in FIGS. 4 and 6, the transverse wall 203 defines a partial bypass slot 205 between the transverse wall 203 and the base 113 for communicating airflow to a main bypass channel 207 located downstream from the partial bypass slot 205.

As described above, the magnetic media disk 115 is rotationally mounted to the base 113 about hub 117. In operation, disk 115 generates an airflow through the partial bypass slot 205. The magnetic media disk 115 has a perimeter edge 211 and a radial center 213. The actuator 121 also is movably mounted to the base 113 and has the transducer 129 for reading data from and/or writing data to the magnetic media disk 115.

In one embodiment, the perimeter edge 211 of the disk 115 has a disk thickness 215 that is shrouded by a portion 217 (FIGS. 4 and 6) of the base 113. In other embodiments comprising a different disk configuration (e.g., two or more disks 215), a portion 219 of the transverse wall 203 aligns with the disk thickness 215 in the z-direction.

In another embodiment, the invention further comprises a diverter assembly 221 that is mounted to the base 113 adjacent to the magnetic media disk 115. The diverter assembly 221 may be provided with a spoiler 223 that extends in the x-y plane direction beyond the perimeter edge 211 of the magnetic media disk 115 toward the radial center 213 of the magnetic media disk 115. Typically, when there is a bypass in a disk drive, the spoiler 223 is referred to as a "diverter," which implies that its purpose is to divert air away from the disk toward the bypass channel. In the embodiment shown, the diverter assembly 221 is located completely external relative to the partial bypass slot 205. A portion 225 (FIGS. 6 and 7) of the diverter assembly 221 may be used to shroud the perimeter edge 211 of the disk 115 in z-direction.

In some embodiments of the invention (FIG. 4), the base 113 may be provided with an x-y datum plane 231, a y-z datum plane 233, and an x-z datum plane 235. The transverse wall 203 may be used to define the x-z datum plane 235. As shown in FIG. 507, the diverter assembly 221 has features 241, 243, 245 (e.g., precisely machined surfaces or features) that abut the datum planes 231, 233, 235, respectively, to align and position the diverter assembly 221 with respect to the partial bypass slot 205 and the magnetic media disk 115. In another embodiment, the transverse wall 203, partial bypass slot 205 and the diverter assembly 221 are integrally formed as a unitary assembly in the enclosure or base 113. The spoiler 223 is used to control or direct air flow that is circulating over the planar surface of the disk (or between disks).

While the invention has been shown or described in only some of its forms, it should be apparent to those skilled in the art that it is not so limited, but is susceptible to various changes without departing from the scope of the invention.

What is claimed is:

1. A hard disk drive, comprising:
an enclosure having a coordinate system defining x, y and z-directions, a base generally extending in an x-y plane direction, a sidewall extending from the base generally in the z-direction, the sidewall substantially circumscribing the base, and a transverse wall generally extending in the x-y plane direction from the sidewall, the transverse wall defining a partial bypass slot between the transverse wall and the base for communicating airflow to a main bypass channel;

a magnetic media disk rotationally mounted to the base and, in operation, generating an airflow through the partial bypass slot, the magnetic media disk having a perimeter edge and a radial center;

an actuator movably mounted to the base and having a transducer for reading data from the magnetic media disk;

a diverter assembly mounted to the base adjacent to the magnetic media disk, the diverter assembly having a spoiler that extends in the x-y plane direction beyond the perimeter edge of the magnetic media disk toward the radial center of the magnetic media disk; and the diverter assembly is located completely external relative to the partial bypass slot, such that airflow through the partial bypass slot goes around the diverter assembly without passing over an x-y surface of the diverter assembly, and an x-z surface of the diverter assembly forms a wall for the partial bypass slot.

2. A hard disk drive according to claim 1, wherein the perimeter edge has a disk thickness that is shrouded by the base which aligns with the disk thickness in the z-direction.

3. A hard disk drive according to claim 1, wherein a portion of the diverter assembly shrouds the perimeter edge of the disk in z-direction.

4. A hard disk drive according to claim 1, wherein the base has an x-y datum plane, a y-z datum plane, and a x-z datum plane, and the diverter assembly has features that abut the datum planes to align and position the diverter assembly with respect to the partial bypass slot and the magnetic media disk.

5. A hard disk drive according to claim 4, wherein the transverse wall defines the x-z datum plane.

6. A hard disk drive according to claim 1, wherein the transverse wall, partial bypass slot and the diverter assembly are integrally formed as a unitary assembly in the enclosure.

7. A hard disk drive according to claim 1, wherein both the transverse wall and the diverter assembly have x-y surfaces that are substantially flush with each other.

8. A hard disk drive, comprising:
an enclosure having a coordinate system defining x, y and z-directions, a base generally extending in an x-y plane direction, a sidewall extending from the base generally in the z-direction, the sidewall substantially circumscribing the base, and a transverse wall generally extending in the x-y plane direction from the sidewall, the transverse wall defining a partial bypass slot between the transverse wall and the base for communicating airflow to a main bypass channel located downstream from the partial bypass slot;

a magnetic media disk rotationally mounted to the base and, in operation, generating an airflow through the partial bypass slot, the magnetic media disk having a perimeter edge and a radial center, the perimeter edge having a disk thickness that is shrouded by the base which aligns with the disk thickness in the z-direction;

an actuator movably mounted to the base and having a transducer for reading data from the magnetic media disk;

a diverter assembly mounted to the base adjacent to the magnetic media disk, the diverter assembly having a spoiler that extends in the x-y plane direction beyond the perimeter edge of the magnetic media disk toward the radial center of the magnetic media disk;

the diverter assembly is located completely external relative to the partial bypass slot, such that airflow through the partial bypass slot is inhibited from passing over an x-y surface of the diverter assembly, and an x-z surface of the diverter assembly forms a wall for the partial bypass slot; and the base has an x-y datum plane and a y-z datum plane, and the transverse wall defines an x-z datum plane, and the diverter assembly has features that abut the datum planes to align and position the diverter assembly with respect to the partial bypass slot and the magnetic media disk.

9. A hard disk drive according to claim 8, wherein a portion of the diverter assembly shrouds the perimeter edge of the disk in z-direction.

10. A hard disk drive according to claim 8, wherein the transverse wall, partial bypass slot and the diverter assembly are integrally formed as a unitary assembly in the enclosure.

11. A hard disk drive according to claim 8, wherein both the transverse wall and the diverter assembly have x-y surfaces that are substantially flush with each other.

12. A hard disk drive, comprising:
an enclosure having a coordinate system defining x, y and z-directions, a base generally extending in an x-y plane direction, a sidewall extending from the base generally in the z-direction, the sidewall substantially circumscribing the base, and a transverse wall generally extending in the x-y plane direction from the sidewall, the transverse wall defining a partial bypass slot between the transverse wall and the base for communicating airflow to a main bypass channel located downstream from the partial bypass slot;

a magnetic media disk rotationally mounted to the base and, in operation, generating an airflow through the partial bypass slot, the magnetic media disk having a perimeter edge and a radial center, the perimeter edge having a disk thickness that is shrouded by the base which aligns with the disk thickness in the z-direction;

an actuator movably mounted to the base and having a transducer for reading data from the magnetic media disk;

a diverter assembly mounted to the base adjacent to the magnetic media disk, the diverter assembly having a spoiler that extends in the x-y plane direction beyond the perimeter edge of the magnetic media disk toward the radial center of the magnetic media disk;

the diverter assembly is located completely external relative to the partial bypass slot, such that airflow through the partial bypass slot is inhibited from passing over an x-y surface of the diverter assembly, an x-z surface of the diverter assembly forms a wall for the partial bypass slot, and a portion of the diverter assembly shrouds the perimeter edge of the disk in z-direction;

the base has an x-y datum plane and a y-z datum plane, and the transverse wall defines an x-z datum plane, and the diverter assembly has features that abut the datum planes to align and position the diverter assembly with respect to the partial bypass slot and the magnetic media disk; and the transverse wall, partial bypass slot and the diverter assembly are integrally formed as a unitary assembly in the enclosure.

13. A hard disk drive according to claim 12, wherein both the transverse wall and the diverter assembly have x-y surfaces that are substantially flush with each other.

* * * * *